United States Patent [19]
Perry et al.

[11] 3,819,850
[45] June 25, 1974

[54] CONDUCTIVE EXPANSION JOINT FOR ELECTRICAL TRANSMISSION SYSTEM

[75] Inventors: Elijah Robert Perry, Scottdale; John C. Cronin, Greensburg, both of Pa.

[73] Assignee: I-T-E Imperial Corporation, Spring House, Pa.

[22] Filed: Dec. 26, 1972

[21] Appl. No.: 318,166

[52] U.S. Cl.............. 174/94 R, 174/13, 174/99 E, 174/DIG. 7
[51] Int. Cl............................................. H01r 5/00
[58] Field of Search............ 174/DIG. 7, 9 F, 12 R, 174/13, 21 CA, 84 R, 86, 94 R, 99 E

[56] References Cited
UNITED STATES PATENTS

| | | | |
|---|---|---|---|
| 679,002 | 7/1901 | Markle | 174/9 F X |
| 730,847 | 6/1903 | Van Gilder et al. | 174/9 F |
| 833,290 | 10/1906 | Betts | 174/DIG. 7 UX |
| 1,955,005 | 4/1934 | Maloney | 174/9 F |
| 3,065,293 | 11/1962 | Overman | 174/99 E UX |
| 3,419,702 | 12/1968 | Piel | 174/9 F X |
| 3,517,112 | 6/1970 | Wahl | 174/DIG. 7 UX |
| 3,590,408 | 7/1971 | Verhagen | 174/9 F X |
| 3,717,929 | 2/1973 | Atkinson et al. | 174/DIG. 7 X |

FOREIGN PATENTS OR APPLICATIONS

| | | | |
|---|---|---|---|
| 1,590,379 | 4/1970 | Germany | 174/DIG. 7 |

*Primary Examiner*—Laramie E. Askin
*Attorney, Agent, or Firm*—Ostrolenk, Faber, Gerb & Soffen

[57] ABSTRACT

Between two conductor sections of a high voltage transmission system, a conduction joint made from a short section of flexible metal, such as sodium, is inserted. The dimensional changes generated by thermal effects are absorbed by the flexible metal. A sheath around the flexible metal joint keeps the metal in place.

9 Claims, 3 Drawing Figures

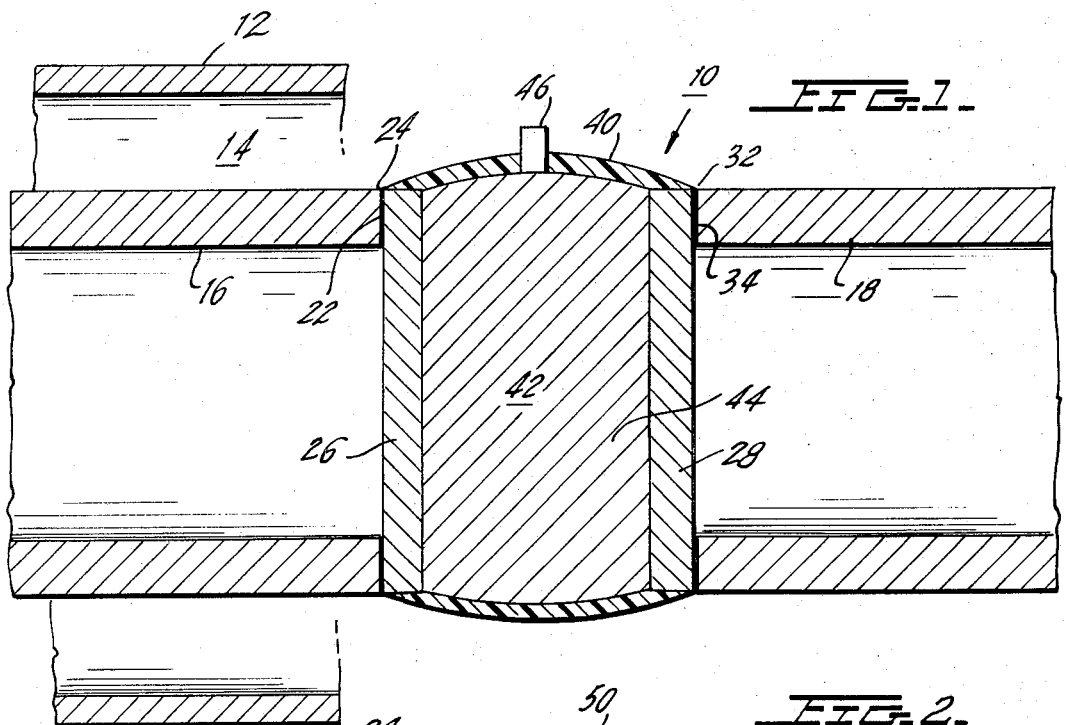
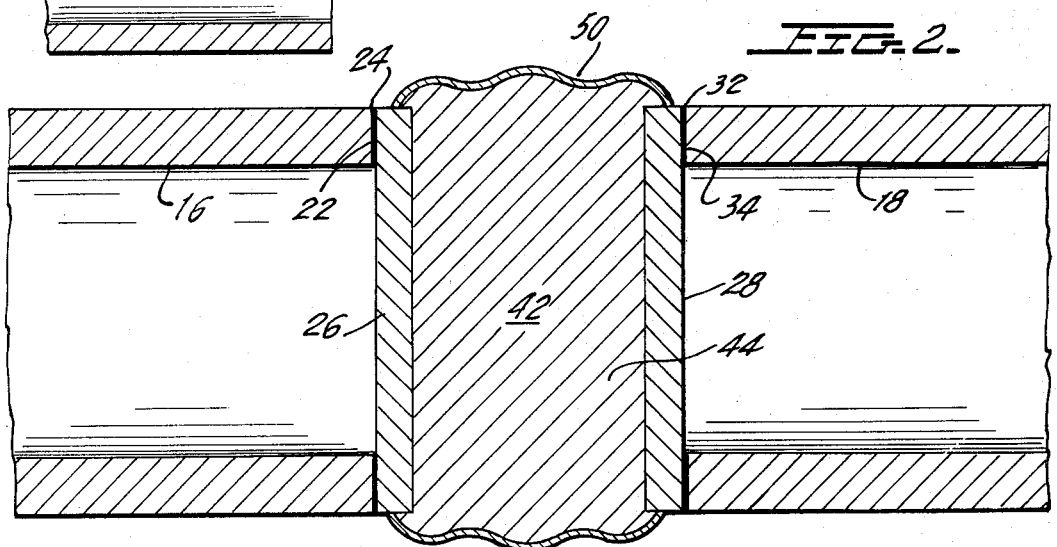
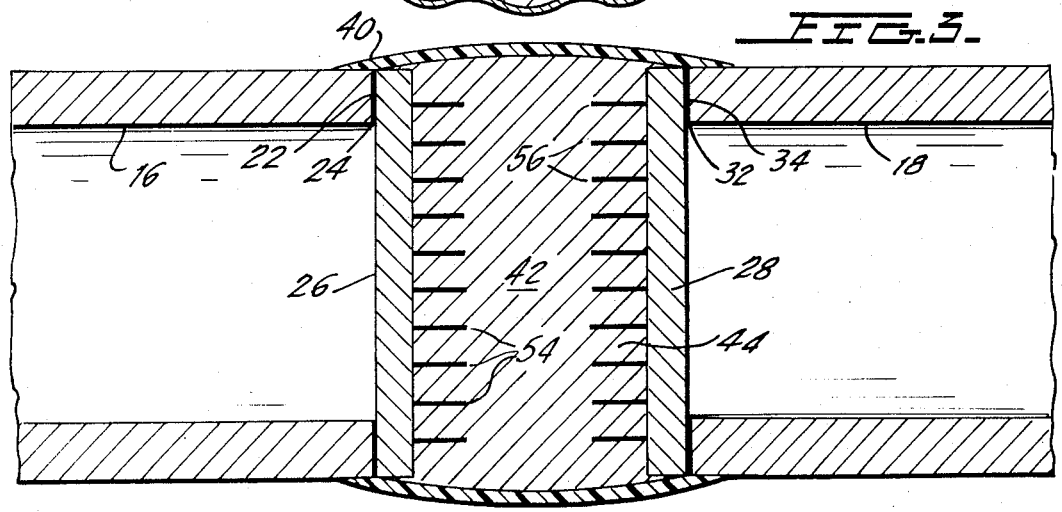

CONDUCTIVE EXPANSION JOINT FOR ELECTRICAL TRANSMISSION SYSTEM

BACKGROUND OF THE INVENTION

High voltage electrical transmission systems, especially of the gas insulated type, employ an elongated metallic cylindrical conductor for each phase. The conductor is co-axially located within an electrical shielding and gas sealing enclosure. Because of thermal effects due to changes in ambient temperature and variations in the current flowing through the conductor, it is necessary to have expansion joints between adjacent sections of the conductor. Joints should be capable of permitting approximately one inch of shifting movement and should also be capable of carrying the same operative and overload currents as the conductor itself.

At present, there are a number of techniques used to absorb thermal expansion. One technique is to have sliding cooperating contacts on each conductor section. The contacts move with respect to each other and maintain the electrical integrity of the conductor. Another technique is to have multiple layers of thin flexible conducting strips extending between the conductors. Both of these frequently used techniques are expensive. Furthermore, corona shields must be used because of the discontinuity in the conductor.

SUMMARY OF THE INVENTION

In accordance with the present invention, the joint between neighboring sections of a conductor is formed by inserting a short section of a flexible metal into the space between the conductor sections. The flexible metal absorbs the dimensional changes generated by thermal effects. A particularly suitable flexible metal is metallic sodium. Although sodium is in its solid form below its melting point of 97.8° C., it is sufficiently plastic to change shape under the thermal expansion stresses of a typical conductor formed from either aluminum or steel. In its liquid form, the sodium is clearly sufficiently flexible and plastic to absorb dimensional changes. A conventional plastic or rubber corrosion resistant flexible sheath extends across and encloses the joint and keeps the flexible metal in position.

As the conductors expand, the section of flexible metal is compressed in length, distorted in width and increased in its cross-sectional dimension with a consequent distortion of the flexible sheath. This will result in a small increase of the diameter of the sleeve, which will only slightly increase the electrical stress. When the conductor is cooled, the facing ends of adjacent conductor sections separate, the sleeve distorts narrower and the flexible plastic metal is distorted to a longer, narrower diameter configuration.

A joint formed in accordance with the present invention is an improvement over prior art joints. Because it has no sliding parts, it eliminates the possibility of the generation of particles within the enclosure around the conductor, which might interfere with the electrical properties of the conductor. Also, it precludes undesirable contact welding which occurs with relatively movable contacts. Any minor dimensional differences between conductor sections meeting at a joint have no significance. By selection of a suitable flexible metal, such as sodium, the resistance of the joint is kept quite low, thereby reducing the possibility of a hot spot developing along the conductor. Furthermore, there is no need for a separate corona shield as the joint itself has a good electrical stress pattern. Finally, the construction in accordance with the present invention is quite simple and should, therefore, be inexpensive.

Accordingly, it is the primary object of the present invention to provide an improved joint or connector between adjacent sections of an elongated conductor.

It is another object of the present invention to provide such a joint or connector, which is able to absorb relative shifting of the sections of the conductor due to thermal effects without significantly disturbing the conductivity characteristics of the conductor.

It is a further object of the present invention to provide such a joint or connector, which does not use any engaging components that slide with respect to each other.

These and other objects of the present invention will become apparent from the following description of the invention, when taken in conjunction with the accompanying drawings.

DESCRIPTION OF THE DRAWINGS

FIG. 1 is a cross-sectional view through a conductor, showing one embodiment of a joint designed in accordance with the present invention;

FIG. 2 is the same type of view as FIG. 1, showing a second embodiment of the invention; and FIG. 3 is the same type of view as FIG. 1 showing a third embodiment of the invention.

DESCRIPTION OF THE PREFERRED EMBODIMENTS

Referring to FIG. 1, elongated conductor 10 is co-axially supported by insulative supporting means (not shown) within metal enclosure 12. Space 14 between conductor 10 and enclosure 12 may be conventionally filled with an insulating medium, such as an insulating gas, sulfur hexafluoride.

Conductor 10 is comprised of a plurality of elongated sections of which sections 16 and 18 are illustrated. Each conductor section is comprised of a tubular open ended pipe of a metal, such as aluminum or steel, which is harder than the below described more flexible metal 44 used in the joint between sections 16 and 18. Conductor sections 16 and 18 have the property that they expand and contract in length due to changes in thermal conditions.

At the annular end 22 of conductor section 16, annular weld 24 joins conductor section sealing, annular, conductive metal plate 26 over the open end of conductor section 16. A similar sealing conductive metal plate 28 is welded at 32 to the facing annular end 34 of conductor section 18. A flexible, corrosion resistant, annular sheath 40 extends between and annularly seals about the peripheries of plates 26, 28, thereby to define with these plates a sealed space 42. Sheath 40 is comprised of a non-conductive material, so that it has no effect upon the conductivity of the system and there are no connections between it and the conductor sections which need to be protected. The flexibility of the sheath prevents the build up of excessive mechanical stresses in the joint. The sheath is of sufficient length that it will be able to absorb the expected shifting apart of plates 26, 28 due to cooling.

Within space 42 is deposited a block of flexible metal having sufficient plasticity to be deformed to a shorter length and greater cross sectional width or diameter when conductor sections 16, 18 expand and plates 26, 28 move toward each other and to contract in cross section and expand in length when conductor sections 16, 18 contract and plates 26, 28 move apart. The type and quantity of metal 44 which is placed in space 42 is selected to ensure that the resulting joint has conductivity characteristics which are compatible with those characteristics of the conductor sections 16, 18.

One possible technique for fabricating the joint shown in FIG. 1 is to mold flexible sheath 40 directly onto the peripheries of plates 26, 28 and to then inject the flexible metal through plug 46 through the sheath until space 42 is completely filled. Plug 46 could then be sealed to prevent subsequent leakage.

In accordance with the present invention, where conductor sections 16, 18 are comprised of aluminum, metal 44 is a block of sodium. One objection to using sodium as a conductor is its relatively low melting point of 97.8° C. Only a small length section of sodium is used so that any change of the sodium into its liquid state due to heating through use does not change the overall system behavior.

As conductor sections 16, 18 expand, as noted, sodium block 44 decreases in length and increases in cross section or diameter. The basic design consideration of the invention seeks to ensure that the diameter change is small enough to avoid a significant increase in dielectric stress at the surface of the expansion joint. This can be controlled by selection of an appropriate length for the metal joint.

In a typical application of the present invention, the conductor sections have a ½ inch wall thickness for a typical 3,000 amp. conductor. The sodium expansion joint is 12 inches long and 6 inches in diameter. The aluminum conductor sections are 6 inches in diameter. The sodium expansion joint would have a resistance approximately twice that of the aluminum resistance per foot. This is much lower than the resistance of typical relatively movable contacts.

If, through use, a cylinder of sodium of length L decreases in length by an increment OL, the change in radius, OR, is as follows:

$$OR = R\{(L/L-OL)^{1/2} - 1\}$$

where $R$ = original radius.

For a 45' section of aluminum conductor, a temperature change of 100° C. leads to an increase in length of 1.25 inches. Therefore, if a sodium expansion joint is used at the end of each 45' section of conductor, it must absorb this change in length. For a joint having a 6 inches diameter cylinder of sodium, the increase in radius as a function of the length of the cylinder is shown in the following table.

|  | Inches | | |
| --- | --- | --- | --- |
| LENGTH | 6 | 12 | 24 |
| OR | 0.36 | 0.21 | 0.1 |

Although a 12 inch length is typical, even for the short 6 inch length, it is relatively easy to accommodate the change in radius of 0.36 inches, provided a smooth peripheral contour is maintained. Such a radius change should be compared with existing aluminum corona shields which must be used, which shields are up to 0.5 inch thick. With the more typical greater length joints, such as 12 inches, radial expansion is much less. These very small increases in the diameter of sheath 40 will create minimal electric stress.

Upon cooling of conductor 10, its sections 16, 18 contract, plates 26, 28 move apart, the length of metal joint section 44 increases and its cross section or diameter decreases. When plates 26, 28 move apart, it is necessary that the length of metal insert 44 expand to maintain engagement with plates 26, 28. Sleeve 40 is flexible, but not expansible, and if space 42 is filled with metal 44, as plates 26, 28 move apart, the diameter of sleeve 40 will decrease and the radially inwardly directed pressure against metal 44 will force the metal against plates 26, 28. Alternatively, sheath 40 may be elastic and thereby continuously apply a radially inwardly directed force to maintain electrical contact between the metal 44 and plates 26, 28.

Referring to FIG. 2, in place of sheath 40, a thin walled corrugated metallic bellows 50 could be used. The bellows would expand and contract as the plates 26, 28 move toward and away from each other. Although it is difficult to use a metallic bellows to carry current, because fabrication of such a bellows becomes difficult for wall thicknesses greater than 0.05 inch, it is the metal 44 which is the current carrying element, not the bellows. The bellows can, therefore, be any desirable thickness having the required mechanical properties without concern for the electrical properties of the bellows.

FIG. 3 illustrates another technique for maintaining electrical contact between metal 44 and end plates 26, 28 when the plates move apart. It is apparent that if the system is out of service, the ambient temperatures may drop below even the installation temperature of the system, and the plates 26, 28 will move further apart than they were when metal 44 was first deposited in space 42. To maintain the electrical contact, both of end plates 26, 28 are provided with at least one and preferably a respective plurality of rigid metallic spikes 54, 56, which spikes are affixed to and are electrically in contact with the end plates and extend out of the end plates and into space 42 to contact the metal 44. The spikes are of aluminum or other suitable rigid metal and are compatible with the metal of the end plates and of conductor sections 16 and 18. As plates 26, 28 separate, spikes 54, 56 begin to withdraw from metal 44. Because of the relative movement between the metal 44 and spikes 54, 56, the contact resistance therebetween is increased and this may cause local overheating when the system is re-energized. However, the metal, particularly sodium, in the vicinity of the spikes can melt to re-establish good contact after which joint resistance drops to its normal value.

There has been described a number of embodiments of joints for high voltage electric conductors, wherein the joint is provided by emplacing a section of flexible conductive metal between the adjacent end faces of neighboring sections of the conductor and enclosing the flexible metal in a protective sheath. The flexible metal is caused to change its length and cross section as a result of the expansion and contraction of the conductor sections. Continuous electrical contact is maintained with the conductor sections, thereby maintaining the integrity of the entire conductor.

Although the present invention has been described in connection with a number of preferred embodiments thereof, many variations and modifications will now become apparent to those skilled in the art. It is preferred, therefore, that the present invention be limited not by the specific disclosure herein, but only by the appended claims.

We claim:

1. A joint between two sections of a metallic conductor wherein the lengths of said conductor sections vary due to varying thermal effects; said sections terminating in and having facing ends which are arranged opposed and substantially parallel and that move toward and away from each other due to the varying thermal effects;

said joint comprising;

a space between said facing ends; a solid block of electrically conductive and plastically deformable material interposed between said facing ends; a sheath extending across said space and being secured to said sections; said solid block of conductive and plastically deformable material being contained within and filling the volume enclosed by said sheath; said sheath being sealed around and onto both of said conductor sections so as to seal said space and said solid block of conductive and plastically deformable material therein, and being thin and elastic to continuously apply a radial compressive force against said block of conductive and plastically deformable material so that as said facing ends move apart, said elastic sheath is stretched therebetween causing the cross-sectional area enclosed by said elastic sheath to decrease and thereby direct pressure along the periphery of said block of conductive and plastically deformable material to press same against respective ones of said facing ends, and as said facing ends move toward one another the cross-sectional area enclosed by said elastic sheath will increase to absorb the lateral expansion of said block of conductive and plastically deformable material as same is compressed between said facing ends.

2. The joint of claim 1, wherein said block of conductive and plastically deformable material is comprised of metallic sodium.

3. The joint of claim 2, further comprising at least one conductive metal spike extending from each said facing end into said space and extending into said block of conductive and plastically deformable material.

4. The joint of claim 1, wherein said elastic sheath is of non-conductive material.

5. The joint of claim 1, wherein said conductor sections are hollow; at each said facing end is positioned a respective conductive metallic end plate to serve to enclose said space and seal off said conductor sections.

6. The joint of claim 5, further comprising at least one conductive metal spike extending from each said end plate into said space and extending into said block of conductive and plastically deformable material.

7. The joint of claim 5, wherein said block of conductive and plastically deformable material is comprised of metallic sodium.

8. In combination, the joint of claim 7 and a protective housing surrounding said conductive sections and being spaced therefrom.

9. The joint of claim 1 wherein said elastic sheath normally has a substantially outwardly bowed longitudinal cross-section.

* * * * *